United States Patent
Levit-Gurevich et al.

(10) Patent No.: US 9,329,974 B2
(45) Date of Patent: May 3, 2016

(54) TECHNOLOGIES FOR DETERMINING BINARY LOOP TRIP COUNT USING DYNAMIC BINARY INSTRUMENTATION

(71) Applicants: Konstantin Levit-Gurevich, Kiryat Byalik (IL); Igor Breger, Haifa (IL)

(72) Inventors: Konstantin Levit-Gurevich, Kiryat Byalik (IL); Igor Breger, Haifa (IL)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 14/316,399

(22) Filed: Jun. 26, 2014

(65) Prior Publication Data

US 2015/0378868 A1 Dec. 31, 2015

(51) Int. Cl.
*G06F 11/36* (2006.01)

(52) U.S. Cl.
CPC ........ *G06F 11/3612* (2013.01); *G06F 11/3692* (2013.01)

(58) Field of Classification Search
CPC ............ G06F 11/3409; G06F 11/3466; G06F 11/3471; G06F 11/3644; G06F 11/0709; G06F 11/0715; G06F 11/0775; G06F 11/302; G06F 11/34; G06F 11/3452; G06F 11/3612
See application file for complete search history.

(56) References Cited

U.S. PATENT DOCUMENTS

| | | | |
|---|---|---|---|
| 8,478,948 B2 * | 7/2013 | Panchenko | G06F 11/3471 711/154 |
| 2012/0079460 A1 * | 3/2012 | Cho | G06F 8/443 717/130 |

* cited by examiner

*Primary Examiner* — Nadeem Iqbal
(74) *Attorney, Agent, or Firm* — Barnes & Thornburg LLP

(57) ABSTRACT

Technologies for binary loop trip count computation include a computing device that dynamically instruments binary code, executes the instrumented code, and records execution statistics during execution of the instrumented code. The computing device may instrument only instructions affecting local control flow within functions of the binary code. The computing device may combine execution statistics from multiple threads or process instances of the binary code. After completing execution of the instrumented code, the computing device generates a control flow graph indicative of control flow of the binary code and recursively detects binary loops within the binary code. The computing device calculates a trip count for reach detected binary loop using the recorded execution statistics. Other embodiments are described and claimed.

23 Claims, 8 Drawing Sheets

| Ref # | Instruction Pointer (IP) | Instruction | Target | Taken Count | Not Taken Count |
|---|---|---|---|---|---|
| 402 | 0x4025d4 | - | - | - | - |
| 404 | 0x4025f4 | jcc | 0x402b82 | $x_1$ | $x_2$ |
| 406 | 0x4025fa | - | - | - | - |
| 408 | 0x402600 | jcc | 0x402b5a | $x_3$ | $x_4$ |
| 410 | 0x402606 | - | - | - | - |
| 412 | 0x402610 | jcc | 0x4025d4 | $x_5$ | $x_6$ |
| 414 | 0x402616 | ret | - | - | - |
| 416 | 0x402b5a | - | - | - | - |
| 418 | 0x402b77 | jcc | 0x4025d4 | $x_7$ | $x_8$ |
| 420 | 0x402b7d | ret | - | - | - |
| 422 | 0x402b82 | - | - | - | - |
| 424 | 0x402b8f | - | - | - | - |
| 426 | 0x402bb9 | jcc | 0x402b8f | $x_9$ | $x_{10}$ |
| 428 | 0x402bbb | - | - | - | - |
| 430 | 0x402bc5 | jmp | 0x4025fa | $x_{11}$ | - |

FIG. 4

TECHNOLOGIES FOR DETERMINING BINARY LOOP TRIP COUNT USING DYNAMIC BINARY INSTRUMENTATION

BACKGROUND

Loops are fundamental programming constructs that instruct a computing device to repeat a section of code a certain number of times. Loops expressed in high-level languages are typically compiled into a sequence of binary instructions including one or more jumps to a previously-executed instruction, which may be known as "binary loops."

Detection of binary loops in a section of code may be used for performance analysis and optimization purposes, and for developing new computer architectures. In particular, binary loop detection and analysis may be used to improve parallelization or vectorization of loops, or for load balancing. One measure of loop performance is trip count, which is a measure of the average number of iterations for each invocation of a binary loop. Binary loop detection is also performed by dynamic compilers such as just-in-time compilers used to execute bytecode. Binary loop detection is typically performed by applying heavy profiling to a binary. Typical binary loop detection techniques are also limited to single-threaded applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 is a table illustrating at least one embodiment of execution statistics that may be recorded by the computing device of FIGS. 1 and 2;

DETAILED DESCRIPTION OF THE DRAWINGS

Figure 1:
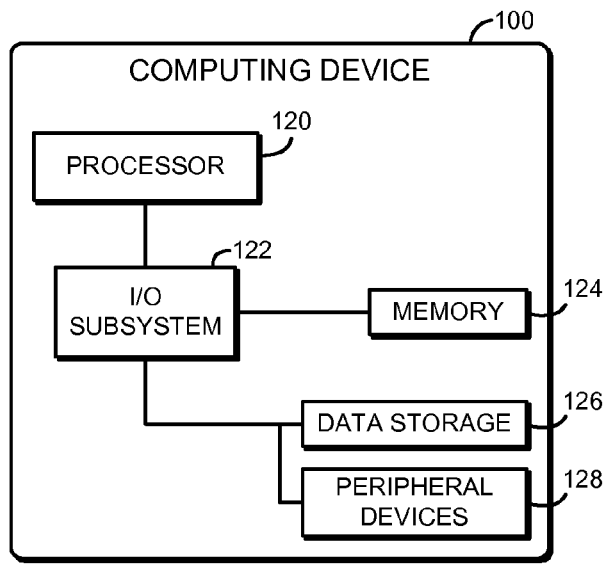
FIG. 1 is a simplified block diagram of at least one embodiment of a computing device for determining binary loop trip count.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for determining binary loop trip count includes a processor 120, an I/O subsystem 122, a memory 124, and a data storage device 126. In use, the computing device 100 dynamically instruments binary code, executes the instrumented code, and records statistical data during execution of the instrumented code. After execution is completed, the computing device 100 analyzes the statistical data to identify binary loops that were executed and to calculate a trip count for each binary loop. The trip count may be embodied as an aggregated number of iterations per invocation of each corresponding binary loop, such as an average number of iterations. Dynamic instrumentation allows the instrumented code to execute with minimal overhead compared to the native binary code. Further, the analysis of the statistical data may be completed in linear time using fast algorithms, and may be performed on multiple concurrent processes or threads. Thus, binary loops may be identified and their performance may be analyzed using fast and efficient algorithms. Additionally, the binary loop performance analysis is scalable for many threads and/or instances of the same process, which may allow for scalable binary loop performance analysis of high-performance computing applications or other multithreaded applications. Additionally, binary loop performance analysis may be performed without specially compiling or otherwise modifying the original binary code.

The computing device 100 may be embodied as any type of device capable of determining binary loop trip count and otherwise performing the functions described herein. For example, the computing device 100 may be embodied as, without limitation, a laptop computer, a notebook computer, a tablet computer, a smartphone, a mobile computing device, a wearable computing device, a computer, a desktop computer, a workstation, a server computer, a distributed computing system, a multiprocessor system, a consumer electronic device, a smart appliance, and/or any other computing device capable of determining binary loop trip count. As shown in FIG. 1, the illustrative computing device 100 includes the processor 120, the I/O subsystem 122, the memory 124, and the data storage device 126. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store images of executable binary code and/or execution statistics recorded during execution of instrumented binary code.

In some embodiments, the computing device 100 may also include one or more peripheral devices 128. The peripheral devices 128 may include any number of additional input/output devices, interface devices, and/or other peripheral devices. For example, in some embodiments, the peripheral devices 128 may include a display, touch screen, graphics circuitry, keyboard, mouse, speaker system, and/or other input/output devices, interface devices, and/or peripheral devices.

Figure 2:
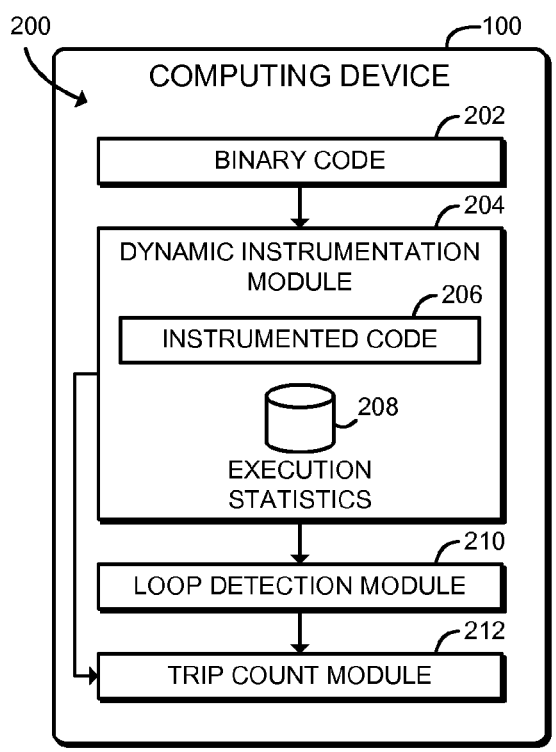
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes binary code 202, a dynamic instrumentation module 204, a loop detection module 210, and a trip count module 212. The various modules of the environment 200 may be embodied as hardware, firmware, software, or a combination thereof.

The binary code 202 may be configured as any executable code, assembly code, bytecode, or other set of instructions that may be executed by the computing device 100. The binary code 202 may thus include application programs, utility programs, servers, drivers, operating systems, or any other code that may be executed by the computing device 100. The binary code 202 may be embodied as production code or other unmodified binary code. Thus, the binary code 202 may not include debugging symbols, profiling support, or other modifications for testing or performance monitoring purposes.

The dynamic instrumentation module 204 is configured to dynamically instrument the binary code 202 to generate instrumented code 206, execute the dynamically instrumented code 206, and record execution statistics 208 during the execution of the dynamically instrumented code 206. The dynamic instrumentation module 204 may dynamically instrument the binary code 202 by generating a new executable binary image based on the binary code 202 that includes instrumented routines, calls, or hooks. For example, the dynamic instrumentation module 204 may generate the instrumented code 206 by binary translation, just-in-time compilation, or any other code generation technique that is capable of instrumenting the binary code 202 at runtime without modifying the original binary code 202. The execution statistics 208 record data indicative of the control flow of the instrumented code 206, including the addresses of jump instructions and return instructions, the target addresses of jumps, and the number of times jumps are taken and/or not taken. The dynamic instrumentation module 204 may achieve near-native code execution performance by instrumenting only a limited number of instructions that affect local control flow within the same function of the binary code 202.

The loop detection module 210 is configured to detect one or more binary loops within the binary code 202 based on the execution statistics 208. Thus, the binary loops may be detected after execution of the instrumented code 206 is completed. The loop detection module 210 may detect the binary loops by building a control flow graph based on the execution statistics 208 and analyzing the control flow graph using linear-time algorithms.

The trip count module 212 is configured to calculate a trip count for each of the detected binary loops using the execution statistics 208. Thus, the trip counts may also be calculated after execution of the instrumented code 206 is completed. Each trip count may be calculated as the average number of iterations for each invocation of a binary loop. Because it is assumed that every binary loop entered during execution of the instrumented code 206 is also exited, the trip count module 212 may determine the number of invocations of each binary loop by determining the number of loop exits of each binary loop. The loop detection module 210 may also calculate the trip counts using linear-time algorithms.

Figure 3:
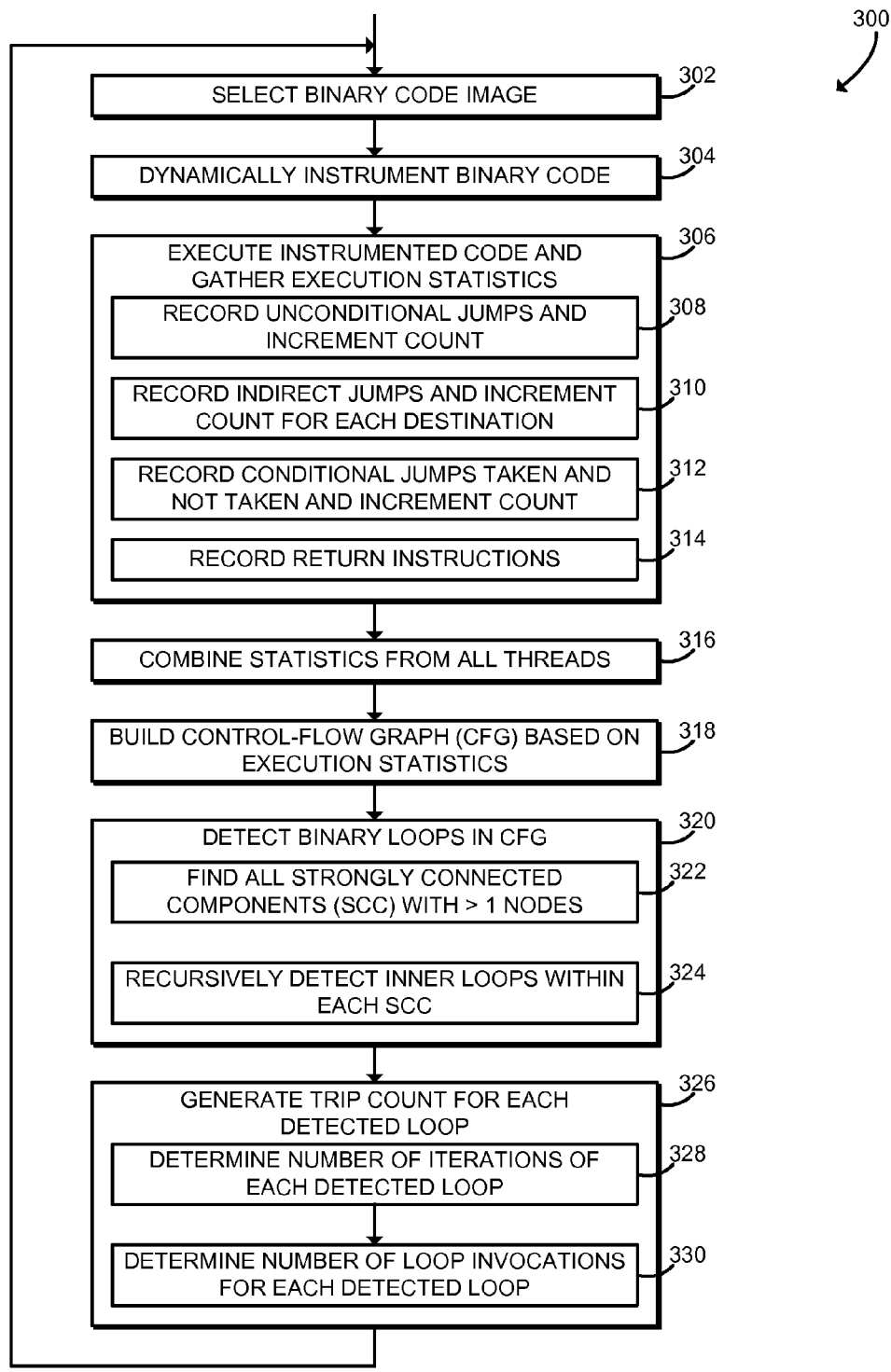
FIG. 3 is a simplified flow diagram of at least one embodiment of a method for determining binary loop trip count that may be executed by the computing device of FIGS. 1 and 2.

Referring now to FIG. 3, in use, the computing device 100 may execute a method 300 for determining binary loop trip count. The method 300 begins in block 302, in which the computing device 100 selects binary code 202 for instrumentation. The binary code 202 may be selected in response to a user selection, for example using a performance analysis tool. In some embodiments, the binary code 202 may be selected without user intervention.

In block 304, the computing device 100 dynamically instruments the binary code 202. As part of dynamically instrumenting the binary code 202, the computing device 100 may generate a new binary image for execution by the computing device 100. For example, the computing device 100 may perform dynamic binary translation, just-in-time compilation, dynamic code generation, or any other appropriate transformation to the binary code 202. The computing device 100 may instrument only instructions within the binary code 202 that affect control flow within the same function. For example, the computing device 100 may instrument unconditional jumps, conditional jumps, and return instructions in the binary code 202. The computing device 100 may assume that the instrumented code 206 does not include system call instructions or interrupt return instructions (e.g., iret, syscall, sysret, sysenter, or sysexit). Additionally, the computing device 100 may assume that general function call instructions (e.g., call) are loop-invariant and thus may not be instrumented. Each instrumented instruction may record data, increment counters, or otherwise trigger routines to monitor and record performance of the binary code 202.

In block 306, the computing device 100 executes the instrumented code 206 associated with the binary code 202 and gathers the execution statistics 208. Because only a limited number of instructions of the binary code 202 may be instrumented, performance of the instrumented code 206 may be similar to performance of the original binary code 202. The computing device 100 may record different data in the execution statistics 208 depending on the particular instrumented instructions that are executed.

In block 308, the computing device 100 may record execution statistics 208 for unconditional jumps and increment a counter for every time an unconditional jump is taken. In particular, the computing device 100 may record the instruction pointer address and destination address of each unconditional jump instruction encountered, as well as the number of times each unconditional jump instruction has been taken, followed, advanced along, or otherwise selected. In block 310, the computing device 100 may record execution statistics 208 for indirect jump instructions and increment a counter for every time an indirect jump is taken followed, advanced along, or otherwise selected. Indirect jump instructions may include unconditional jump instructions with destination address calculated based on a register value or a memory value. The computing device 100 may record the instruction pointer address and the calculated destination address for each indirect jump instruction. The computing device 100 may maintain independent counters for each combination of indirect jump instruction pointer and calculated destination address. In block 312, the computing device 100 may record execution statistics 208 for conditional jump instruction and increment either a taken counter or a not-taken counter for each conditional jump instruction. In particular, the computing device 100 may record the instruction pointer address, destination address, and fallthrough (not-taken) address for each conditional jump instruction, as well as the number of times each conditional jump instruction is taken, followed, advanced along, or otherwise selected, and the number of times each conditional jump instruction is not taken (i.e., the number of times the associated fallthrough address is taken, followed, advanced along, or otherwise selected). In block 314, the computing device 100 may record execution statistics 208 for return instructions, including an instruction pointer address. The computing device 100 may not record a taken count for return instructions, as those instructions may represent loop exits and thus may not be included in the body of any binary loops.

An illustrative example of execution statistics 208 that may be gathered during execution of instrumented code 206 is shown in FIG. 4. The execution statistics 208 are illustrated as a data table 400. The illustrative data table 400 includes a number of rows 402 through 430. Each row represents a data item that may be recorded by the computing device 100 during execution of the instrumented code 206. Each row may include, among other data, an instruction pointer address, an instruction type, a target address, a taken count, and a not taken count. As shown, some of the data items may be unused for certain instruction types. As shown, the row 430 represents unconditional jump instruction (jmp) to the address 0x4025fa, and has a taken count represented as $x_{11}$. The rows 404, 408, 412, 418, 426 all represent conditional jump instructions (jcc) and, accordingly, each include both taken counts and not taken counts. The rows 414, 420 represent return instructions (ret). The remaining rows 402, 406, 410, 416, 422, 424, 428 represent destination addresses of unconditional or conditional jump instructions or fall-through addresses of conditional jump instructions. For example, row 402 represents the destination address for the conditional jump instruction of row 412, and row 410 represents the fallthrough address for the conditional jump instruction of row 408. The rows 402, 406, 410, 416, 422, 424, 428 may be recorded by the computing device 100 in response to executing the corresponding unconditional jump or conditional jump instructions.

Referring back to FIG. 3, in block 316, after execution of the instrumented code 206, the computing device 100 combines execution statistics 208 for all threads that were executed. The computing device 100 may combine the execution statistics 208 by concatenating or merging the data describing the execution statistics 208. Thus, the computing device 100 may process both single-threaded and multi-threaded applications using the same processes.

In block 318, the computing device 100 builds a control-flow graph (CFG) based on the recorded execution statistics 208. The control-flow graph is a directed graph data structure that represents the flow of execution recorded during the execution of the instrumented code 206. Thus, the control-flow graph may record data indicative of all binary loops encountered during execution of the instrumented code 206. Because the control-flow graph is based on the execution of the instrumented code 206, it may not include certain loops included in the binary code 202 or its corresponding source code. For example, the control-flow graph may not include source loops that have been unrolled during compilation or optimization or binary loops that are not reached during execution of the instrumented code 206. Building the control-flow graph is described further below in connection with FIGS. 5 and 6.

In block 320, the computing device 100 detects all binary loops, including nested binary loops, within the control-flow graph. In block 322, the computing device 100 finds all strongly connected components (SCCs) within the control-flow graph having more than one node. A strongly connected component is a subgraph of a directed graph in which every node is reachable from every other node of the subgraph and is the maximum subgraph having such a property. The computing device 100 may find the strongly-connected components within the control-flow graph using a linear-time algorithm. Each strongly-connected component found within the control-flow graph represents a loop, and may represent the outer loop of a nested loop system. In block 324, after identifying the strongly-connected components of the control-flow graph, the computing device 100 recursively detects inner loops within each of the strongly connected components. Each recursive search of the strongly connected components may also be performed by the computing device 100 in linear time. The number of recursions required to detect all binary loops depends on the nesting depth of the nested loop system. Because nested loop systems tend to be relatively shallow, the recursive search tends to stabilize relatively quickly. Detecting the binary loops is further described below in connection with FIGS. 7 and 8.

In block 326, after identifying the binary loops, the computing device 100 generates a trip count for each detected loop. To perform that calculation, in block 328, the computing device 100 determines the number of iterations of each detected loop. In block 330, the computing device 100 determines the number of invocations for each detected loop. The trip count may then be calculated for each detected loop by finding the average number of iterations for each invocation. Calculation of the trip count is described further below in connection with FIG. 9. After calculating the trip count for each detected loop, the method 300 loops back to block 302 to continue selecting binary code 202 for instrumentation. After looping back to block 302, the computing device 100 may determine binary trip count for binary code 202 for a different application or for a new run of the same application, for example using different input or feedback data.

Figure 5:
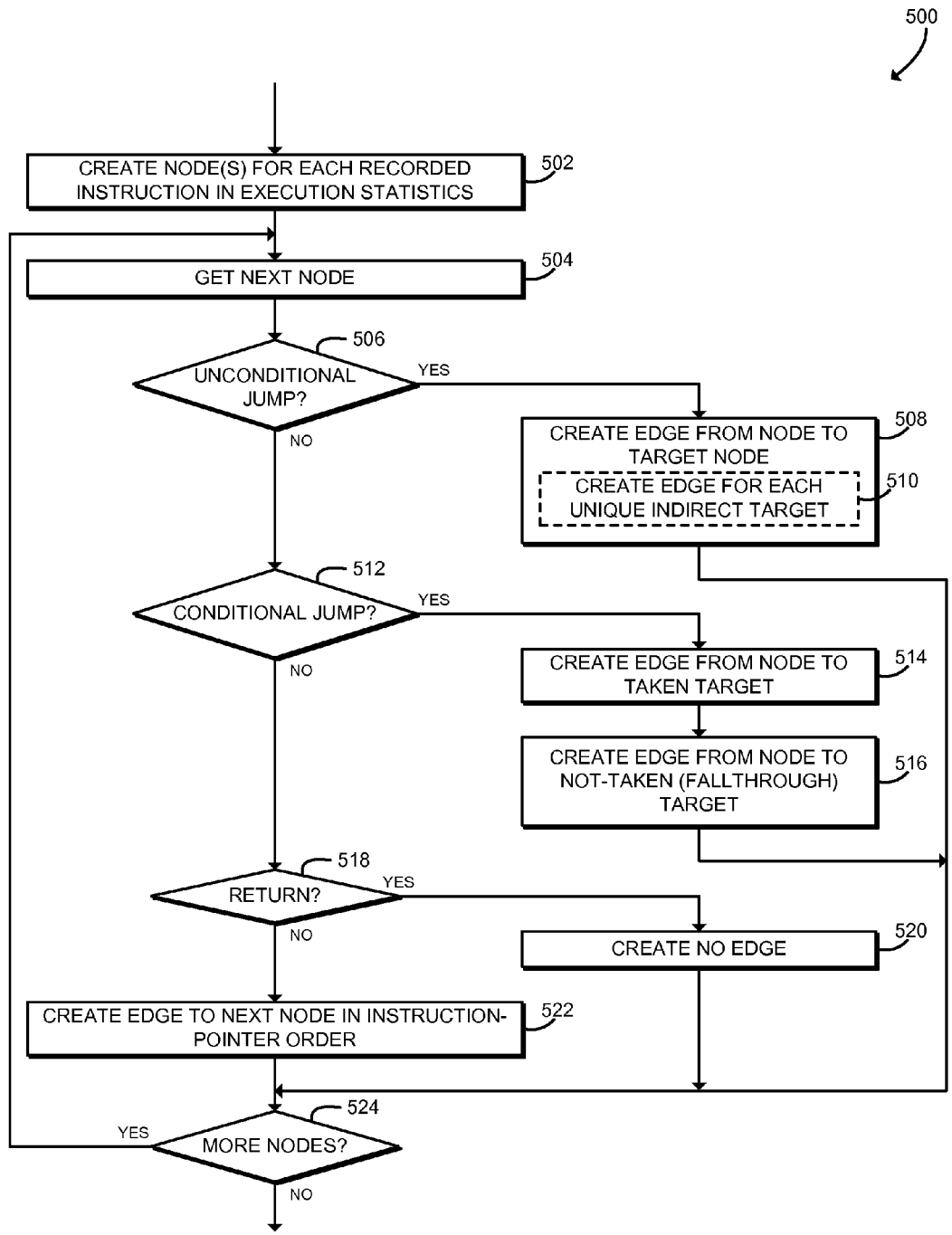
FIG. 5 is a simplified flow diagram of at least one embodiment of a method for building a control-flow graph that may be executed by the computing device of FIGS. 1 and 2.

Referring now to FIG. 5, in use, the computing device 100 may execute a method 500 for building a control-flow graph based on recorded execution statistics 208. The method 500 may be executed, for example, in connection with block 318 of FIG. 3, described above. The method 500 begins in block 502, in which the computing device 100 creates graph nodes corresponding to each instruction in the recorded execution statistics 208. As described above, graph nodes may be created for unconditional jump instructions, conditional jump instructions, and return instructions, as well as for target addresses of unconditional or conditional jump instructions and fall-through addresses for conditional jump instructions.

In block 504, the computing device 100 obtains or accesses the next graph node to be processed. The computing device 100 may process the graph nodes in any order. In some embodiments, the computing device 100 may process the graph nodes in ascending order sorted by instruction pointer address. In block 506, the computing device 100 determines whether the current node is an unconditional jump instruction. If not, the method 500 branches to block 512. If the current node is an unconditional jump instruction, the method 500 branches to block 508.

In block 508, the computing device 100 creates a graph edge from the current graph node to the graph node for the target address of the current node. In some embodiments, in block 510, the computing device 100 may create a graph edge for each unique indirect target of the current graph node. After creating any graph edges, the method 500 advances to block 524, described below.

Referring back to block 506, if the current node is not an unconditional jump instruction, the method 500 branches ahead to block 512, in which the computing device 100 determines whether the current node is a conditional jump instruction. If not, the method 500 branches ahead to block 518, described below. If the current node is a conditional jump instruction, the method 500 branches to block 514.

In block 514, the computing device 100 creates a graph edge from the current node to the graph node for the target address of the current node; that is, to the graph node that is taken when the conditional jump instruction is satisfied. In block 516, the computing device 100 creates a graph edge from the current node to the fallthrough (or not-taken) target address of the current node; that is, to the graph node that is taken when the conditional jump instruction is not satisfied. After creating the graph edges, the method 500 advances to block 524, described below.

Referring back to block 512, if the current node is not a conditional jump instruction, the method 500 branches to block 518, in which the computing device 100 determines whether the current node is a return instruction. If not, the method 500 branches ahead to block 522, described below. If the current node is a return instruction, the method 500 branches to block 520.

In block 520, the computing device 100 creates no graph edges. In other words, there are no graph edges from a return instruction to other nodes within the control-flow graph. After processing the return instruction, the method 500 branches ahead to block 524, described below.

Referring back to block 518, if the current node is not a return instruction, the method 500 advances to block 522. In block 522, the computing device 100 creates a graph edge from the current node to the next node in the graph in instruction-pointer order. Thus for all instructions not previously processed (i.e., nodes for jump target addresses), the control flow graph advances to the next instruction in instruction pointer order. After creating the graph edge, the method 500 proceeds to block 524.

In block 524, the computing device 100 determines whether additional graph nodes remain to be processed. If so, the method 500 loops back to block 504 to get the next node and continue building the control flow graph. If no further nodes remain, the method 500 is completed. Thus, the control-flow graph may be built from the recorded execution statistics 208 in linear time. After building the control flow graph, the computing device 100 may analyze the control flow graph to detect binary loops.

Figure 6:
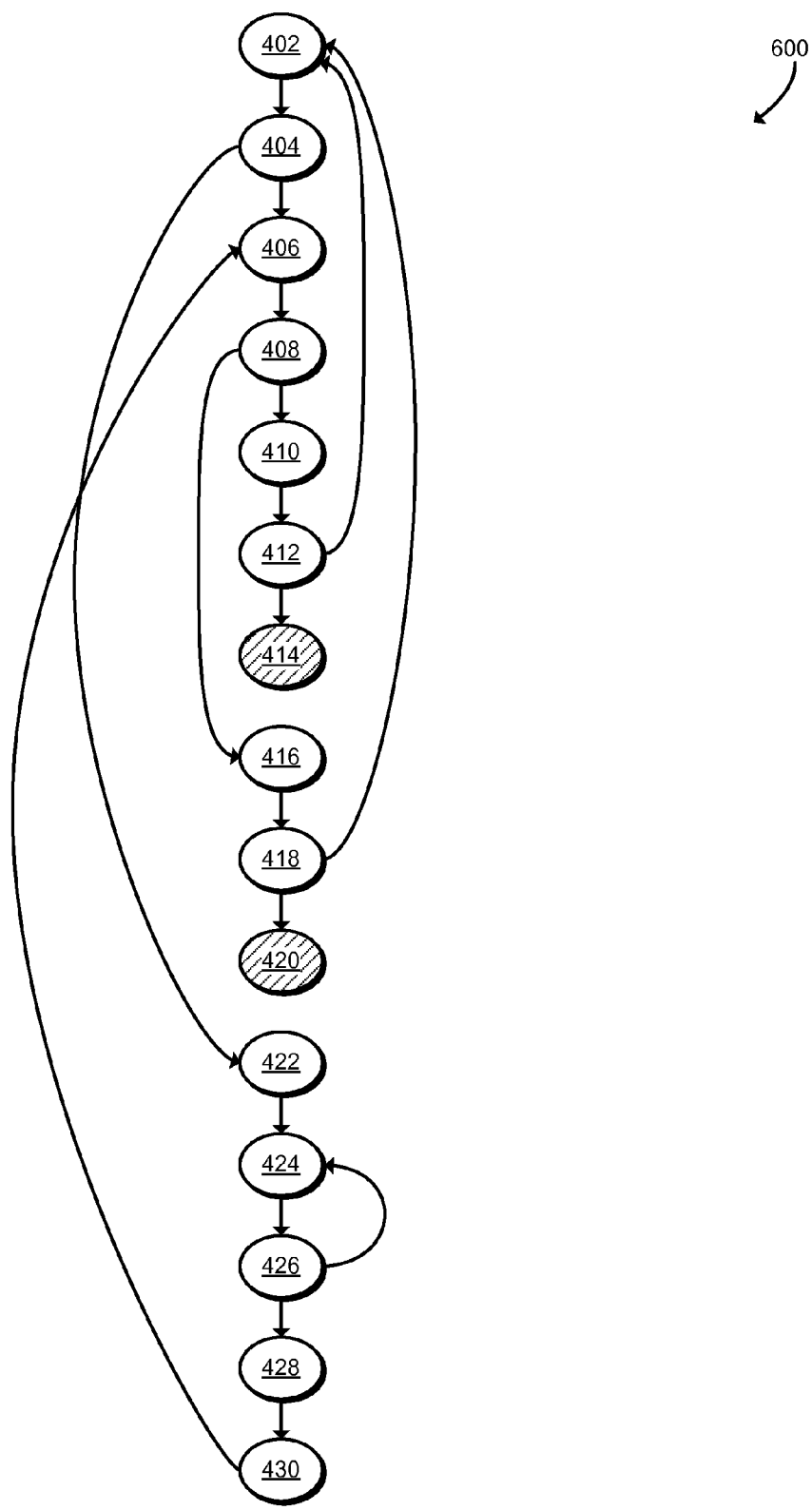
FIG. 6 is a schematic diagram illustrating a control-flow graph that may be generated by the computing device of FIGS. 1 and 2.

An illustrative control flow graph is shown in FIG. 6. The illustrative graph 600 corresponds to the recorded execution statistics 208 shown in the data table 400 of FIG. 4. As shown, each of the rows 402 through 430 of the data table 400 has a corresponding node in the graph 600. As an example illustrating generation of the control-flow graph 600, the node 430 corresponds to an unconditional jump instruction and accordingly is connected by a single edge to node 406. As another example, node 404 corresponds to a conditional jump instruction and is connected by an edge to its target node 422 and by another edge to its fallthrough node 406. As a third example, the node 414 corresponds to a return instruction and is not the source of any edges. As a last example, the node 402 corresponds to a target address and is connected by an edge to the next node 404. The other nodes and edges of the graph 600 may be constructed in a similar manner.

Figure 7:
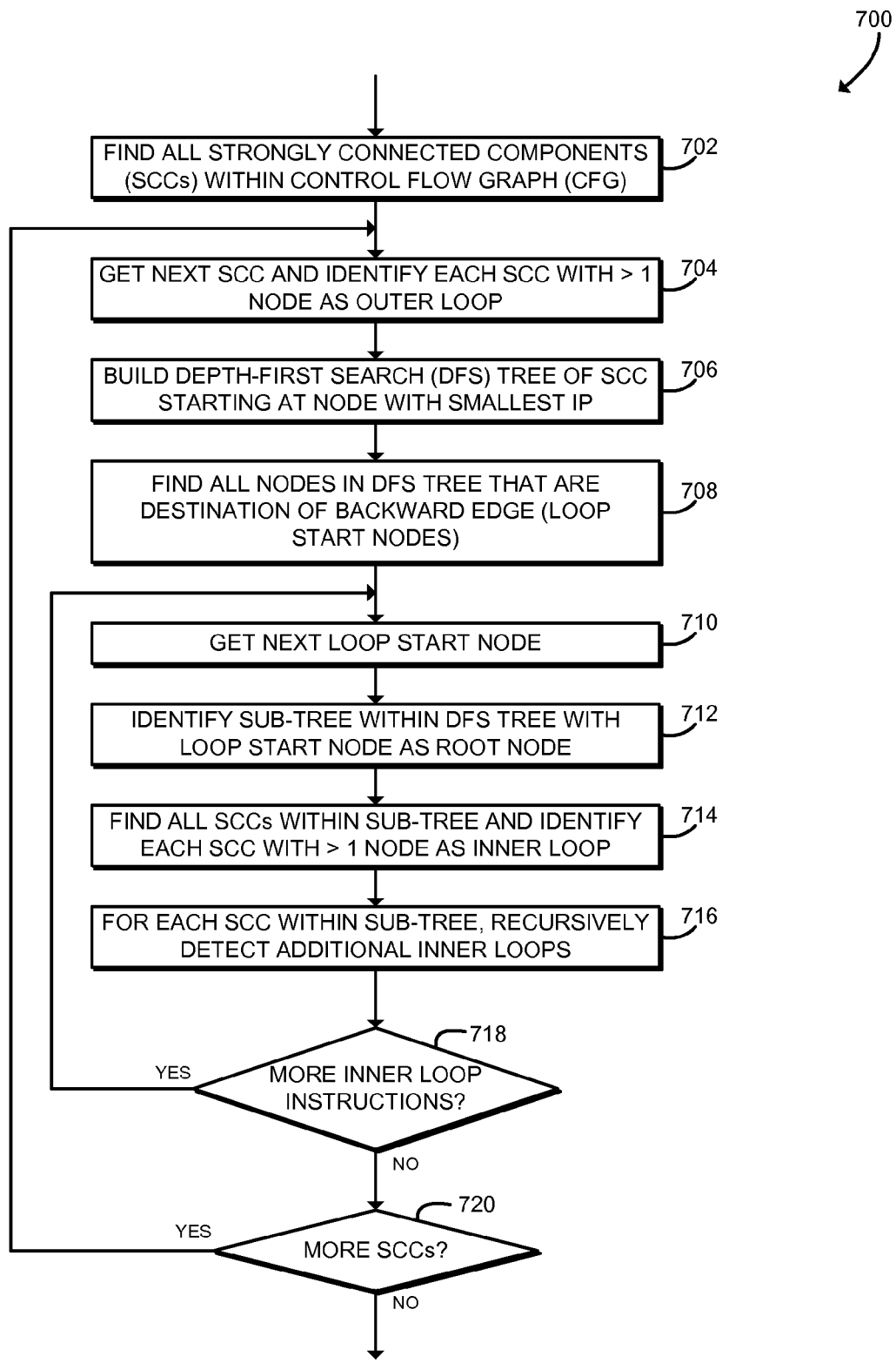
FIG. 7 is a simplified flow diagram of at least one embodiment of a method for recursively detecting binary loops that may be executed by the computing device of FIGS. 1 and 2.

Referring now to FIG. 7, in use, the computing device 100 may execute a method 700 for detecting binary loops within the control-flow graph. The method 700 may be executed, for example, in connection with block 320 of FIG. 3, described above. The method 700 begins in block 702, in which the computing device 100 finds all strongly connected components (SCCs) within the control-flow graph (CFG). As described above, each strongly connected component is a subgraph of the control-flow graph in which each node may be reached from every other node within the strongly-connected component. In addition, each strongly connected component is maximal with that property; in other words, no additional edges or nodes from the control-flow graph may be added without breaking the property that each node is strongly connected. The computing device 100 may use any algorithm to identify strongly connected components, such as Tarjan's strongly connected components algorithm or the path-based strongly connected component algorithm. Referring back to FIG. 6, the illustrative control-flow graph 600 includes a single strongly-connected component including all of the unshaded nodes 402, 404, 406, 408, 410, 412, 416, 418, 422, 424, 426, 428, 430. As a corollary, the shaded nodes 414, 420 (corresponding to return instructions) are not included in the strongly-connected component.

Referring again to FIG. 7, in block 704 the computing device 100 gets the next identified strongly connected component including more than one node. That strongly connected component is identified as defining an outer binary loop. The outer binary loop may include a single binary loop or, potentially, a nested binary loop system. The computing device 100 identifies only strongly connected components including more than one node because single-node strongly connected components are not considered to be binary loops.

After identifying the outer loop, in block 706 the computing device 100 builds a depth-first search (DFS) tree of the strongly connected component starting at the node of the strongly connected component with the smallest instruction pointer address. The computing device 100 may use any algorithm to build the depth-first search tree. The computing device 100 may build the depth-first search tree in linear time. In the illustrative method 700, the computing device 100 starts building the DFS tree from the node of the SCC with the smallest instruction pointer address; however, in other embodiments, the computing device 100 may start building the DFS tree from any node within the SCC.

Figure 8:
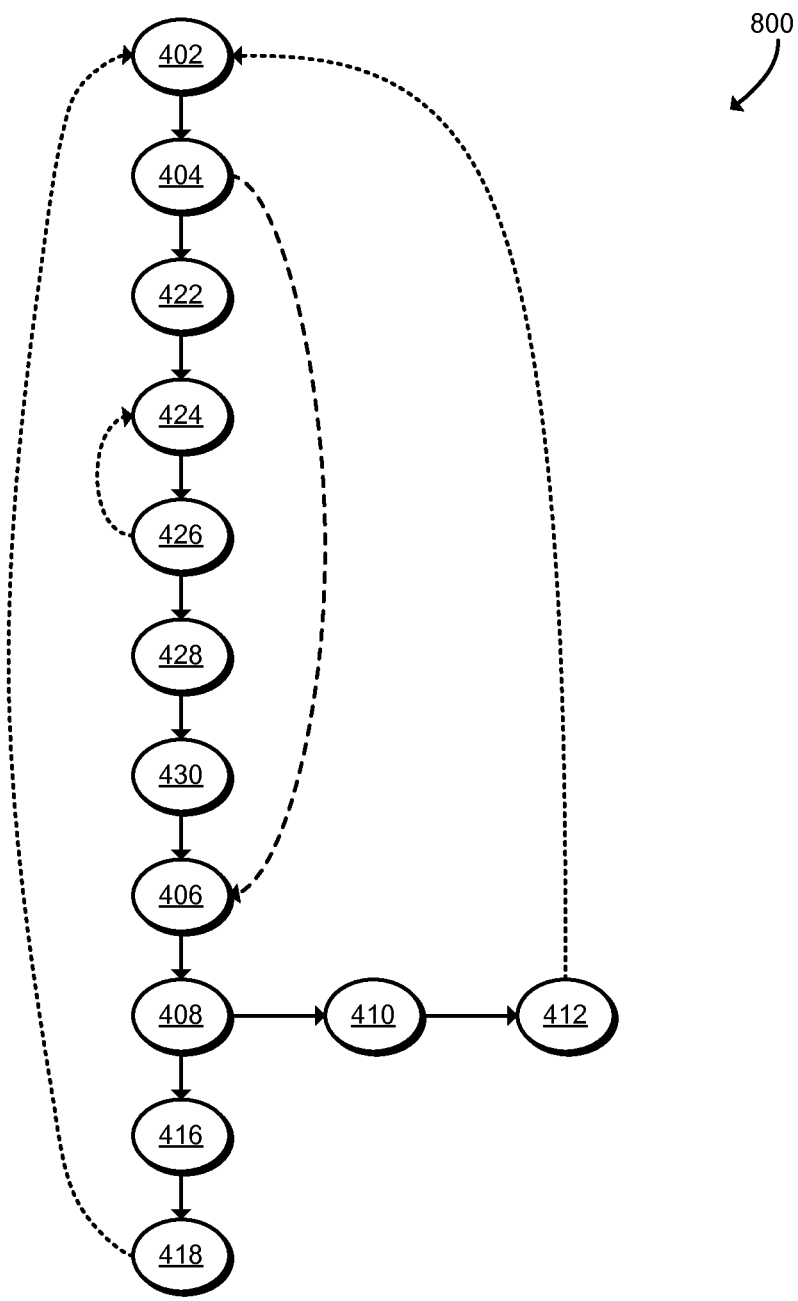
FIG. 8 is a schematic diagram of a depth-first search tree that may be generated by the computing device of FIGS. 1 and 2.

In block 708, the computing device 100 finds all nodes within the depth-first search tree that are a destination of a backward edge. Those nodes each start an inner loop within within the strongly connected component and thus may be referred to as loop start nodes. In some embodiments, depending on how the DFS tree is constructed, each loop start node may also correspond to a starting instruction of the inner loop (i.e., the node having the smallest corresponding instruction pointer address). An illustrative depth-first search tree 800 is shown in FIG. 8. The depth-first search tree 800 corresponds to the illustrative control-flow graph 600 shown in FIG. 6, described above. In the illustrative depth-first search tree 800, tree edges are illustrated as solid arrows between nodes. Forward edges are illustrated as dashed arrows between nodes, such as the dashed arrow from the node 404 to the node 406. Backward edges are illustrated as dotted arrows, such as the dotted arrows from the nodes 418, 412 to the node 402 and from the node 426 to the node 424. Thus, the nodes 402, 424 are destinations of backward edges and thus are loop start nodes. In the illustrative embodiment, the nodes 402, 424 also correspond to starting instructions of loops within the strongly connected component. In the illustrative embodiment, node 402 is the loop start node of the outer loop, and node 424 is the loop start node of an inner loop.

Referring back to FIG. 7, in block 710 the computing device 100 gets the next loop start node found in block 708. The computing device 100 may process the loop start nodes in any order, for example in corresponding instruction pointer address order. In block 712, the computing device 100 identifies a sub-tree within the depth-first search tree using the loop start node as the root node of the sub-tree. If the sub-tree includes the entire depth-first search tree, then the corresponding loop start node may be the starting node for the outer loop initially identified in block 704, above. In block 714, the computing device 100 finds all strongly connected components within the sub-tree, and identifies each of those strongly connected components having more than one node as an inner loop.

In block 716, the computing device 100 recursively detects additional inner loops within each of the strongly connected components identified in block 714. For example, the computing device 100 may build a depth-first search tree for each strongly connected component, find all nodes in the depth-first search tree that are destinations of backward edges, identify sub-trees for those nodes, and find strongly connected components in those sub-trees, as described above in blocks 706, 708, 712, 714. The number of recursions required to find all inner loops depends on the depth of the nested loop system in the control flow graph. Thus, the search algorithm may stabilize relatively quickly, because nested loop systems tend to be relatively shallow.

To illustrate, refer again to FIG. 8. As described above, the nodes 402, 424 are destination nodes of backward edges and thus are loop start nodes. Starting with the node 402, a sub-tree using the node 402 as root may include the entire depth-first search tree 800. Thus, the node 402 is the loop start node for the outer loop of the nested loop system. Continuing with the node 424, a sub-tree using the node 424 as root may include the nodes 424, 426, 428, 430, 406, 408, 416, 418, 410, 412. That sub-tree includes a single strongly connected component, including nodes 424, 426. Thus, the node 424 is the loop start node an inner loop including the nodes 424, 426. Recursive application of that algorithm may not find any additionally nested inner loops.

Referring back to FIG. 7, in block 718, the computing device 100 determines whether additional loop start nodes—nodes of the depth-first search tree that are targets of backward edges—remain to be processed. If additional nodes remain, the method 700 loops back to block 710 to process the next node. If no additional nodes remain, the method 700 advances to block 720, in which the computing device 100 determines whether additional strongly connected components within the control-flow graph remain to be processed. If additional strongly connected components remain, the method 700 loops back to block 704 to continue processing strongly connected components. If no strongly connected components remain, then the method 700 is completed. After completion, the computing device 100 may have identified all binary loops executed by the instrumented code 206, including inner loops. Each binary loop may be identified by the instructions included in the loop (i.e., the associated strongly connected component) and by the loop start node (i.e., the root node of the associated sub-tree).

Figure 9:
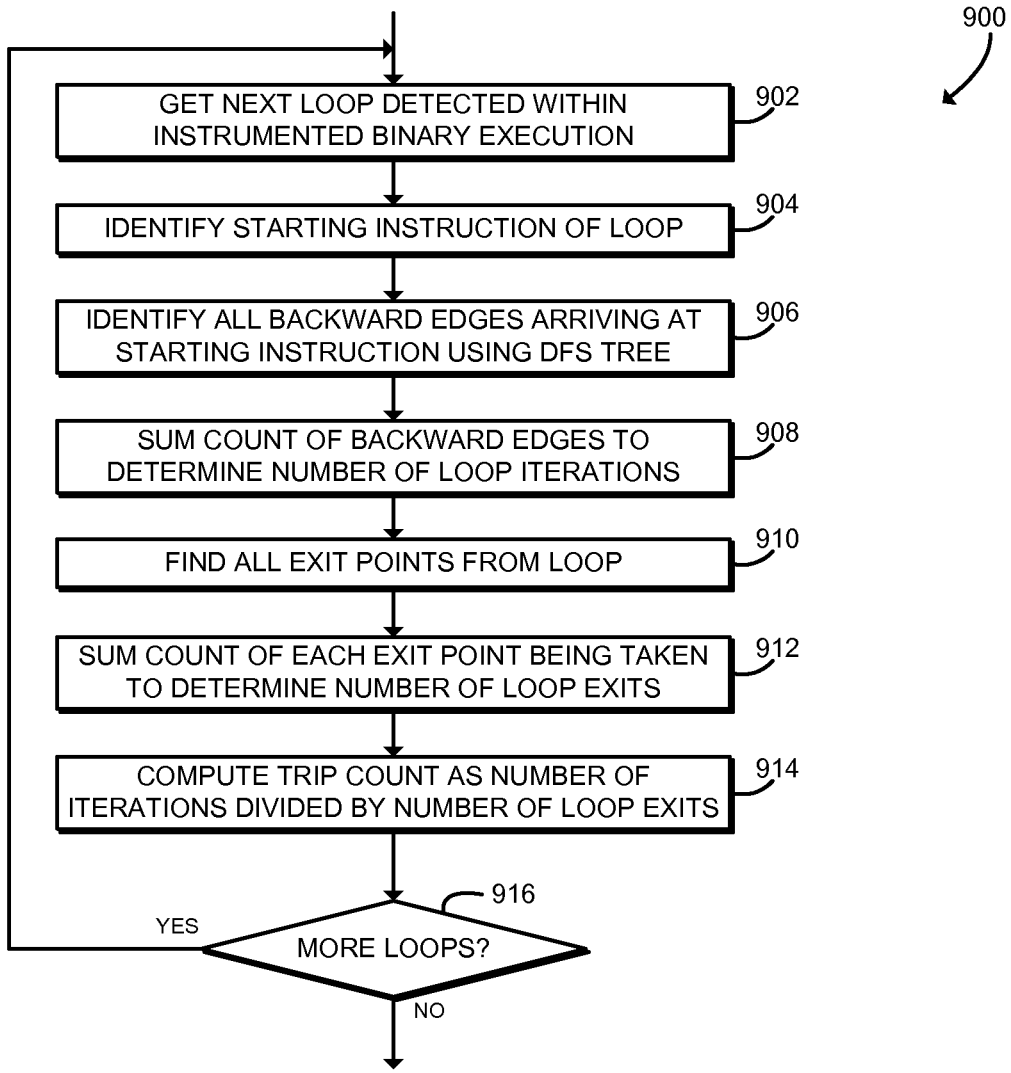
FIG. 9 is a simplified flow diagram of at least one embodiment of a method for calculating trip count that may be executed by the computing device of FIGS. 1 and 2.

Referring now to FIG. 9, in use, the computing device 100 may execute a method 900 for calculating trip count. The method 900 may be executed, for example, in connection with block 326 of FIG. 3, described above. The method 900 begins in block 902, in which the computing device 100 gets the next binary loop that has been previously identified. The binary loops may be detected as described above in connection with FIG. 7 and thus may include outer loops and inner loops. The computing device 100 may process the binary loops in any order. In block 904, the computing device 100 identifies the loop start node of the binary loop. The computing device 100 may use any appropriate technique to identify the start node. For example, as described above in block 708 of FIG. 7, the loop start node of each binary loop may be a destination of a backward edge in the depth-first search tree. As another example, as described above in block 712 of FIG. 7, the loop start node of each binary loop may be the root node of a sub-tree of the depth-first search tree.

In block 906, using the depth-first search tree, the computing device 100 identifies all backward edges arriving at the loop start node. Those edges represent all of the paths in the control flow graph that arrive at the loop start node of the loop. Thus, the total number of times each of those edges was taken corresponds to the total number of iterations of the binary loop. Accordingly, in block 908, the computing device 100 sums the count of each of those backward edges to determine the number of iterations of the current binary loop. The computing device 100 uses the counter recorded in the execution statistics 208 associated with each of the backward edges to generate the total number of iterations.

In block 910, the computing device 100 finds all exit points from the binary loop. An exit point may be identified as an edge of the control-flow graph that exits the strongly-connected component associated with the binary loop. Thus the count of each edge exiting the strongly connected component corresponds to the number of times execution of the binary loop exited via that edge. Accordingly, in block 912, the computing device 100 sums the count of each exit point to determine the total number of loop exits for the binary loop.

In block 914, the computing device 100 computes the trip count for the binary loop by dividing the number of iterations of the binary loop by the number of loop exists. As described above, it is assumed that the number of binary loop exits corresponds to the number of times the binary loop is entered, and thus corresponds to the total number of invocations of the binary loop. Thus, the trip count represents the average number of iterations of the binary loop for each loop invocation. In block 916, the computing device 100 determines whether additional binary loops remain to be processed. If so, the method 900 loops back to block 902 to process the next binary loop. If not, the method 900 is completed, and trip counts have been generated for all detected binary loops.

To illustrate trip count calculation, refer to the control flow graph 600 shown in FIG. 6. As may be determined as described above in connection with FIGS. 7 and 8, an outer loop starts at the node 402. As shown in FIG. 8, the node 402 may be reached by backward edges from the nodes 412, 418. Thus, the total number of iterations of the outer loop starting at the node 402 may be calculated as the sum of the number of times those backward edges are taken. Referring to the table 400 of execution statistics 208 shown in FIG. 4, the total number of iterations thus equals $x_7+x_5$. As shown in FIG. 6, the outer loop starting at the node 402 includes the strongly connected component including the nodes 402, 404, 406, 408, 410, 412, 416, 418, 422, 424, 426, 428, 430. The exit points from that outer loop include the edge from the node 412 to the node 414 and the edge from the node 418 to the node 420. Thus, again referring to the table 400 of FIG. 4, the total number of loop exits (and, therefore, the total number of loop invocations) equals $x_6+x_8$. Based on those values, the trip count for the outer loop starting at the node 402 may be calculated as $$\frac{x_7 + x_5}{x_6 + x_8}.$$

As another example, referring to the control flow graph 600 of FIG. 6 and as may be determined as described above in connection with FIGS. 7 and 8, an inner loop starts at the node 424. As shown in FIG. 8, the node 424 may be reached by a backward edge only from the node 426. Thus, referring to the table 400 of FIG. 4, the total number of iterations of the inner loop starting at the node 424 is equal to $x_9$. As shown in FIG. 8, the subtree of the depth-first search tree 800 using the node 424 as root includes a strongly connected component including the nodes 424, 426, which corresponds to the inner loop. The exit point from that inner loop is the edge from the node 426 to the node 428. Referring again to the table 400 of FIG. 4, the total number of loop exits (and, therefore, the total number of loop invocations) equals $x_{10}$. Based on those values, the trip count for the inner loop starting at the node 424 may be calculated as $$\frac{x_9}{x_{10}}.$$

EXAMPLES

Illustrative examples of the technologies disclosed herein are provided below. An embodiment of the technologies may include any one or more, and any combination of, the examples described below.

Example 1 includes a computing device for binary loop trip count computation, the computing device comprising a dynamic instrumentation module to (i) dynamically instrument binary code to generate instrumented code that is executable by the computing device, (ii) execute the instrumented code in response to the dynamic instrumentation of the binary code, and (iii) record execution statistics indicative of control flow of the binary code during execution of the instrumented code; a loop detection module to (i) build a control-flow graph indicative of the control flow of the binary code based on the recorded execution statistics and (ii) recursively detect one or more binary loops within the control-flow graph; and a trip count module to calculate a trip count for each of the detected one or more binary loops using the recorded execution statistics, wherein the trip count is indicative of an aggregated number of iterations per invocation of each corresponding binary loop.

Example 2 includes the subject matter of Example 1, and wherein to dynamically instrument the binary code comprises to dynamically instrument the binary code in each of a plurality of threads; to execute the instrumented code comprises to execute each of the plurality of threads contemporaneously; to record the execution statistics comprises to record execution statistics indicative of control flow of the binary code from each of the plurality of threads; and to build the control-flow graph comprises to build the control-flow graph based on the recorded execution statistics combined from all of the plurality of threads.

Example 3 includes the subject matter of any of Examples 1 and 2, and wherein to calculate the trip count for each of the one or more binary loops comprises to determine a number of iterations of each of the one or more binary loops; and determine a number of invocations of each of the one or more binary loops.

Example 4 includes the subject matter of any of Examples 1-3, and wherein to dynamically instrument the binary code comprises to dynamically instrument each unconditional jump instruction, conditional jump instruction, and return instruction of the binary code.

Example 5 includes the subject matter of any of Examples 1-4, and wherein to record the execution statistics comprises to record an instruction pointer address, a destination address, and a taken count for each unconditional jump instruction.

Example 6 includes the subject matter of any of Examples 1-5, and wherein to record the destination address comprises to record an indirect destination address for an indirect unconditional jump instruction.

Example 7 includes the subject matter of any of Examples 1-6, and wherein to record the execution statistics comprises to record an instruction pointer address, a destination address, and a taken count for each conditional jump instruction.

Example 8 includes the subject matter of any of Examples 1-7, and wherein to record the execution statistics further comprises to record a fallthrough address and a not-taken count for each conditional jump instruction.

Example 9 includes the subject matter of any of Examples 1-8, and wherein to record the execution statistics comprises to record an instruction pointer address for each return instruction.

Example 10 includes the subject matter of any of Examples 1-9, and wherein to build the control-flow graph comprises to create a graph node representing each unconditional jump instruction, conditional jump instruction, return instruction, destination instruction pointer address, and fallthrough instruction pointer address indicated by the recorded execution statistics; create, for each graph node representing an unconditional jump instruction, a graph edge from the graph node representing the unconditional jump instruction to a graph node representing a destination instruction pointer address of the unconditional jump instruction; create, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and create, for each other graph node not representing a return instruction, a graph edge from the graph node to a next graph node in instruction pointer address order.

Example 11 includes the subject matter of any of Examples 1-10, and wherein to recursively detect the one or more binary loops within the control-flow graph comprises to identify a strongly-connected component that has a plurality of graph nodes within the control-flow graph.

Example 12 includes the subject matter of any of Examples 1-11, and wherein to recursively detect the one or more binary loops within the control-flow graph further comprises to build a depth-first search tree of the strongly-connected component, wherein the depth-first search tree has a root node that is the graph node that has the smallest instruction pointer address within the strongly-connected component.

Example 13 includes the subject matter of any of Examples 1-12, and wherein to recursively detect the one or more binary loops within the control-flow graph further comprises to detect all loop start graph nodes within the strongly-connected component, wherein each loop start graph node is a destination of a backward edge of the depth-first search tree.

Example 14 includes the subject matter of any of Examples 1-13, and wherein to recursively detect the one or more binary loops within the control-flow graph further comprises to identify a subtree of the depth-first search tree, wherein the subtree has a root node that is a first graph node of the loop start graph nodes; and identify a second strongly-connected component that has a plurality of graph nodes within the subtree.

Example 15 includes the subject matter of any of Examples 1-14, and wherein to calculate the trip count for each of the one or more binary loops comprises to determine a number of iterations of each of the one or more binary loops; and to determine the number of iterations of a binary loop comprises to sum a taken count associated with all backward edges of the depth-first search tree that have a destination that is a root node of the strongly-connected component associated with the binary loop.

Example 16 includes the subject matter of any of Examples 1-15, and wherein to calculate the trip count for each of the one or more binary loops comprises to determine a number of invocations of each of the one or more binary loops; and to determine the number of invocations of a binary loop comprises to identify all edges of the control flow graph that exit the strongly-connected component associated with the binary loop; and sum a taken count associated with the edges that exit the strongly-connected component, wherein the taken count is indicative of a number of times that the control flow of the binary code followed each of the edges that exit the strongly-connected component.

Example 17 includes a method for binary loop trip count computation, the method comprising dynamically instrumenting, by a computing device, binary code to generate instrumented code that is executable by the computing device; executing, by the computing device, the instrumented code in response to dynamically instrumenting the binary code; recording, by the computing device while executing the instrumented code, execution statistics indicative of control flow of the binary code; building, by the computing device, a control-flow graph indicative of the control flow of the binary code based on the recorded execution statistics; recursively detecting, by the computing device, one or more binary loops within the control-flow graph; and calculating, by the computing device, a trip count for each of the detected one or more binary loops using the recorded execution statistics, wherein the trip count is indicative of an aggregated number of iterations per invocation of each corresponding binary loop.

Example 18 includes the subject matter of Example 17, and wherein dynamically instrumenting the binary code comprises dynamically instrumenting the binary code in each of a plurality of threads; executing the instrumented code comprises executing each of the plurality of threads contemporaneously; recording the execution statistics comprises recording execution statistics indicative of control flow of the binary code from each of the plurality of threads; and building the control-flow graph comprises building the control-flow graph based on the recorded execution statistics combined from all of the plurality of threads.

Example 19 includes the subject matter of any of Examples 17 and 18, and wherein calculating the trip count for each of the one or more binary loops comprises determining a number of iterations of each of the one or more binary loops; and determining a number of invocations of each of the one or more binary loops.

Example 20 includes the subject matter of any of Examples 17-19, and wherein dynamically instrumenting the binary code comprises dynamically instrumenting each unconditional jump instruction, conditional jump instruction, and return instruction of the binary code.

Example 21 includes the subject matter of any of Examples 17-20, and wherein recording the execution statistics comprises recording an instruction pointer address, a destination address, and a taken count for each unconditional jump instruction.

Example 22 includes the subject matter of any of Examples 17-21, and wherein recording the destination address comprises recording an indirect destination address for an indirect unconditional jump instruction.

Example 23 includes the subject matter of any of Examples 17-22, and wherein recording the execution statistics comprises recording an instruction pointer address, a destination address, and a taken count for each conditional jump instruction.

Example 24 includes the subject matter of any of Examples 17-23, and wherein recording the execution statistics further comprises recording a fallthrough address and a not-taken count for each conditional jump instruction.

Example 25 includes the subject matter of any of Examples 17-24, and wherein recording the execution statistics comprises recording an instruction pointer address for each return instruction.

Example 26 includes the subject matter of any of Examples 17-25, and wherein building the control-flow graph comprises creating a graph node representing each unconditional jump instruction, conditional jump instruction, return instruction, destination instruction pointer address, and fallthrough instruction pointer address indicated by the recorded execution statistics; creating, for each graph node representing an unconditional jump instruction, a graph edge from the graph node representing the unconditional jump instruction to a graph node representing a destination instruction pointer address of the unconditional jump instruction; creating, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and creating, for each other graph node not representing a return instruction, a graph edge from the graph node to a next graph node in instruction pointer address order.

Example 27 includes the subject matter of any of Examples 17-26, and wherein recursively detecting the one or more binary loops within the control-flow graph comprises identifying a strongly-connected component having a plurality of graph nodes within the control-flow graph.

Example 28 includes the subject matter of any of Examples 17-27, and wherein recursively detecting the one or more binary loops within the control-flow graph further comprises building a depth-first search tree of the strongly-connected component, wherein the depth-first search tree has a root node that is the graph node having the smallest instruction pointer address within the strongly-connected component.

Example 29 includes the subject matter of any of Examples 17-28, and wherein recursively detecting the one or more binary loops within the control-flow graph further comprises detecting all loop start graph nodes within the strongly-connected component, wherein each loop start graph node is a destination of a backward edge of the depth-first search tree.

Example 30 includes the subject matter of any of Examples 17-29, and wherein recursively detecting the one or more binary loops within the control-flow graph further comprises identifying a subtree of the depth-first search tree, wherein the subtree has a root node that is a first graph node of the loop start graph nodes; and identifying a second strongly-connected component having a plurality of graph nodes within the subtree.

Example 31 includes the subject matter of any of Examples 17-30, and wherein calculating the trip count for each of the one or more binary loops comprises determining a number of iterations of each of the one or more binary loops; and determining the number of iterations of a binary loop comprises summing a taken count associated with all backward edges of the depth-first search tree having a destination that is a root node of the strongly-connected component associated with the binary loop.

Example 32 includes the subject matter of any of Examples 17-31, and wherein calculating the trip count for each of the one or more binary loops comprises determining a number of invocations of each of the one or more binary loops; and determining the number of invocations of a binary loop comprises identifying all edges of the control flow graph exiting the strongly-connected component associated with the binary loop; and summing a taken count associated with the edges exiting the strongly-connected component, wherein the taken count is indicative of a number of times that the control flow of the binary code followed each of the edges that exit the strongly-connected component.

Example 33 includes a computing device comprising a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for binary loop trip count computation, the computing device comprising means for dynamically instrumenting binary code to generate instrumented code that is executable by the computing device; means for executing the instrumented code in response to dynamically instrumenting the binary code; means for recording, while executing the instrumented code, execution statistics indicative of control flow of the binary code; means for building a control-flow graph indicative of the control flow of the binary code based on the recorded execution statistics; means for recursively detecting one or more binary loops within the control-flow graph; and means for calculating a trip count for each of the detected one or more binary loops using the recorded execution statistics, wherein the trip count is indicative of an aggregated number of iterations per invocation of each corresponding binary loop.

Example 37 includes the subject matter of Example 36, and wherein the means for dynamically instrumenting the binary code comprises means for dynamically instrumenting the binary code in each of a plurality of threads; the means for executing the instrumented code comprises means for executing each of the plurality of threads contemporaneously; the means for recording the execution statistics comprises means for recording execution statistics indicative of control flow of the binary code from each of the plurality of threads; and the means for building the control-flow graph comprises means for building the control-flow graph based on the recorded execution statistics combined from all of the plurality of threads.

Example 38 includes the subject matter of any of Examples 36 and 37, and wherein the means for calculating the trip count for each of the one or more binary loops comprises means for determining a number of iterations of each of the one or more binary loops; and means for determining a number of invocations of each of the one or more binary loops.

Example 39 includes the subject matter of any of Examples 36-38, and wherein the means for dynamically instrumenting the binary code comprises means for dynamically instrumenting each unconditional jump instruction, conditional jump instruction, and return instruction of the binary code.

Example 40 includes the subject matter of any of Examples 36-39, and wherein the means for recording the execution statistics comprises means for recording an instruction pointer address, a destination address, and a taken count for each unconditional jump instruction.

Example 41 includes the subject matter of any of Examples 36-40, and wherein the means for recording the destination address comprises means for recording an indirect destination address for an indirect unconditional jump instruction.

Example 42 includes the subject matter of any of Examples 36-41, and wherein the means for recording the execution statistics comprises means for recording an instruction pointer address, a destination address, and a taken count for each conditional jump instruction.

Example 43 includes the subject matter of any of Examples 36-42, and wherein the means for recording the execution statistics further comprises means for recording a fallthrough address and a not-taken count for each conditional jump instruction.

Example 44 includes the subject matter of any of Examples 36-43, and wherein the means for recording the execution statistics comprises means for recording an instruction pointer address for each return instruction.

Example 45 includes the subject matter of any of Examples 36-44, and wherein the means for building the control-flow graph comprises means for creating a graph node representing each unconditional jump instruction, conditional jump instruction, return instruction, destination instruction pointer address, and fallthrough instruction pointer address indicated by the recorded execution statistics; means for creating, for each graph node representing an unconditional jump instruction, a graph edge from the graph node representing the unconditional jump instruction to a graph node representing a destination instruction pointer address of the unconditional jump instruction; means for creating, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and means for creating, for each other graph node not representing a return instruction, a graph edge from the graph node to a next graph node in instruction pointer address order.

Example 46 includes the subject matter of any of Examples 36-45, and wherein the means for recursively detecting the one or more binary loops within the control-flow graph comprises means for identifying a strongly-connected component having a plurality of graph nodes within the control-flow graph.

Example 47 includes the subject matter of any of Examples 36-46, and wherein the means for recursively detecting the one or more binary loops within the control-flow graph further comprises means for building a depth-first search tree of the strongly-connected component, wherein the depth-first search tree has a root node that is the graph node having the smallest instruction pointer address within the strongly-connected component.

Example 48 includes the subject matter of any of Examples 36-47, and wherein the means for recursively detecting the one or more binary loops within the control-flow graph further comprises means for detecting all loop start graph nodes within the strongly-connected component, wherein each loop start graph node is a destination of a backward edge of the depth-first search tree.

Example 49 includes the subject matter of any of Examples 36-48, and wherein the means for recursively detecting the one or more binary loops within the control-flow graph further comprises means for identifying a subtree of the depth-first search tree, wherein the subtree has a root node that is a first graph node of the loop start graph nodes; and means for identifying a second strongly-connected component having a plurality of graph nodes within the subtree.

Example 50 includes the subject matter of any of Examples 36-49, and wherein the means for calculating the trip count for each of the one or more binary loops comprises means for determining a number of iterations of each of the one or more binary loops; and the means for determining the number of iterations of a binary loop comprises means for summing a taken count associated with all backward edges of the depth-first search tree having a destination that is a root node of the strongly-connected component associated with the binary loop.

Example 51 includes the subject matter of any of Examples 36-50, and wherein the means for calculating the trip count for each of the one or more binary loops comprises means for determining a number of invocations of each of the one or more binary loops; and the means for determining the number of invocations of a binary loop comprises means for identifying all edges of the control flow graph exiting the strongly-connected component associated with the binary loop; and means for summing a taken count associated with the edges exiting the strongly-connected component, wherein the taken count is indicative of a number of times that the control flow of the binary code followed each of the edges that exit the strongly-connected component.

The invention claimed is:

1. A computing device for binary loop trip count computation, the computing device comprising:
   a dynamic instrumentation module to (i) dynamically instrument binary code to generate instrumented code that is executable by the computing device, (ii) execute the instrumented code in response to the dynamic instrumentation of the binary code, and (iii) record execution statistics indicative of control flow of the binary code during execution of the instrumented code;
   a loop detection module to (i) build a control-flow graph indicative of the control flow of the binary code based on the recorded execution statistics and (ii) recursively detect one or more binary loops within the control-flow graph; and
   a trip count module to calculate a trip count for each of the detected one or more binary loops using the recorded execution statistics, wherein the trip count is indicative of an aggregated number of iterations per invocation of each corresponding binary loop.

2. The computing device of claim 1, wherein:
   to dynamically instrument the binary code comprises to dynamically instrument the binary code in each of a plurality of threads;
   to execute the instrumented code comprises to execute each of the plurality of threads contemporaneously;
   to record the execution statistics comprises to record execution statistics indicative of control flow of the binary code from each of the plurality of threads; and
   to build the control-flow graph comprises to build the control-flow graph based on the recorded execution statistics combined from all of the plurality of threads.

3. The computing device of claim 1, wherein to calculate the trip count for each of the one or more binary loops comprises to:

determine a number of iterations of each of the one or more binary loops; and determine a number of invocations of each of the one or more binary loops.

4. The computing device of claim 1, wherein to dynamically instrument the binary code comprises to dynamically instrument each unconditional jump instruction, conditional jump instruction, and return instruction of the binary code.

5. The computing device of claim 4, wherein to build the control-flow graph comprises to:

create a graph node representing each unconditional jump instruction, conditional jump instruction, return instruction, destination instruction pointer address, and fallthrough instruction pointer address indicated by the recorded execution statistics;

create, for each graph node representing an unconditional jump instruction, a graph edge from the graph node representing the unconditional jump instruction to a graph node representing a destination instruction pointer address of the unconditional jump instruction;

create, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and create, for each other graph node not representing a return instruction, a graph edge from the graph node to a next graph node in instruction pointer address order.

6. The computing device of claim 1, wherein to recursively detect the one or more binary loops within the control-flow graph comprises to identify a strongly-connected component that has a plurality of graph nodes within the control-flow graph.

7. The computing device of claim 6, wherein to recursively detect the one or more binary loops within the control-flow graph further comprises to build a depth-first search tree of the strongly-connected component, wherein the depth-first search tree has a root node that is the graph node that has the smallest instruction pointer address within the strongly-connected component.

8. The computing device of claim 7, wherein to recursively detect the one or more binary loops within the control-flow graph further comprises to detect all loop start graph nodes within the strongly-connected component, wherein each loop start graph node is a destination of a backward edge of the depth-first search tree.

9. The computing device of claim 8, wherein to recursively detect the one or more binary loops within the control-flow graph further comprises to:

identify a subtree of the depth-first search tree, wherein the subtree has a root node that is a first graph node of the loop start graph nodes; and identify a second strongly-connected component that has a plurality of graph nodes within the subtree.

10. The computing device of claim 8, wherein:

to calculate the trip count for each of the one or more binary loops comprises to determine a number of iterations of each of the one or more binary loops; and to determine the number of iterations of a binary loop comprises to sum a taken count associated with all backward edges of the depth-first search tree that have a destination that is a root node of the strongly-connected component associated with the binary loop.

11. The computing device of claim 6, wherein:

to calculate the trip count for each of the one or more binary loops comprises to determine a number of invocations of each of the one or more binary loops; and to determine the number of invocations of a binary loop comprises to:

identify all edges of the control flow graph that exit the strongly-connected component associated with the binary loop; and sum a taken count associated with the edges that exit the strongly-connected component, wherein the taken count is indicative of a number of times that the control flow of the binary code followed each of the edges that exit the strongly-connected component.

12. A method for binary loop trip count computation, the method comprising:

dynamically instrumenting, by a computing device, binary code to generate instrumented code that is executable by the computing device;

executing, by the computing device, the instrumented code in response to dynamically instrumenting the binary code;

recording, by the computing device while executing the instrumented code, execution statistics indicative of control flow of the binary code;

building, by the computing device, a control-flow graph indicative of the control flow of the binary code based on the recorded execution statistics;

recursively detecting, by the computing device, one or more binary loops within the control-flow graph; and calculating, by the computing device, a trip count for each of the detected one or more binary loops using the recorded execution statistics, wherein the trip count is indicative of an aggregated number of iterations per invocation of each corresponding binary loop.

13. The method of claim 12, wherein:

dynamically instrumenting the binary code comprises dynamically instrumenting the binary code in each of a plurality of threads;

executing the instrumented code comprises executing each of the plurality of threads contemporaneously;

recording the execution statistics comprises recording execution statistics indicative of control flow of the binary code from each of the plurality of threads; and building the control-flow graph comprises building the control-flow graph based on the recorded execution statistics combined from all of the plurality of threads.

14. The method of claim 12, wherein:

dynamically instrumenting the binary code comprises dynamically instrumenting each unconditional jump instruction, conditional jump instruction, and return instruction of the binary code; and building the control-flow graph comprises:

creating a graph node representing each unconditional jump instruction, conditional jump instruction, return instruction, destination instruction pointer address, and fallthrough instruction pointer address indicated by the recorded execution statistics;

creating, for each graph node representing an unconditional jump instruction, a graph edge from the graph node representing the unconditional jump instruction to a graph node representing a destination instruction pointer address of the unconditional jump instruction;

creating, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and creating, for each other graph node not representing a return instruction, a graph edge from the graph node to a next graph node in instruction pointer address order.

15. The method of claim 12, wherein recursively detecting the one or more binary loops within the control-flow graph comprises:

identifying a strongly-connected component having a plurality of graph nodes within the control-flow graph;

building a depth-first search tree of the strongly-connected component, wherein the depth-first search tree has a root node that is the graph node having the smallest instruction pointer address within the strongly-connected component; and detecting all loop start graph nodes within the strongly-connected component, wherein each loop start graph node is a destination of a backward edge of the depth-first search tree.

16. The method of claim 15, wherein:

calculating the trip count for each of the one or more binary loops comprises determining a number of iterations of each of the one or more binary loops; and determining the number of iterations of a binary loop comprises summing a taken count associated with all backward edges of the depth-first search tree having a destination that is a root node of the strongly-connected component associated with the binary loop.

17. The method of claim 15, wherein:

calculating the trip count for each of the one or more binary loops comprises determining a number of invocations of each of the one or more binary loops; and determining the number of invocations of a binary loop comprises:

identifying all edges of the control flow graph exiting the strongly-connected component associated with the binary loop; and summing a taken count associated with the edges exiting the strongly-connected component, wherein the taken count is indicative of a number of times that the control flow of the binary code followed each of the edges that exit the strongly-connected component.

18. One or more computer-readable storage media comprising a plurality of instructions that in response to being executed cause a computing device to:

dynamically instrument binary code to generate instrumented code that is executable by the computing device;

execute the instrumented code in response to dynamically instrumenting the binary code;

record, while executing the instrumented code, execution statistics indicative of control flow of the binary code;

build a control-flow graph indicative of the control flow of the binary code based on the recorded execution statistics;

recursively detect one or more binary loops within the control-flow graph; and calculate a trip count for each of the detected one or more binary loops using the recorded execution statistics, wherein the trip count is indicative of an aggregated number of iterations per invocation of each corresponding binary loop.

19. The one or more computer-readable storage media of claim 18, wherein:

to dynamically instrument the binary code comprises to dynamically instrument the binary code in each of a plurality of threads;

to execute the instrumented code comprises to execute each of the plurality of threads contemporaneously;

to record the execution statistics comprises to record execution statistics indicative of control flow of the binary code from each of the plurality of threads; and to build the control-flow graph comprises to build the control-flow graph based on the recorded execution statistics combined from all of the plurality of threads.

20. The one or more computer-readable storage media of claim 18, wherein:

to dynamically instrument the binary code comprises to dynamically instrument each unconditional jump instruction, conditional jump instruction, and return instruction of the binary code; and to build the control-flow graph comprises to:

create a graph node representing each unconditional jump instruction, conditional jump instruction, return instruction, destination instruction pointer address, and fallthrough instruction pointer address indicated by the recorded execution statistics;

create, for each graph node representing an unconditional jump instruction, a graph edge from the graph node representing the unconditional jump instruction to a graph node representing a destination instruction pointer address of the unconditional jump instruction;

create, for each graph node representing a conditional jump instruction, (i) a graph edge from the graph node representing the conditional jump instruction to a graph node representing a destination instruction pointer address of the conditional jump instruction and (ii) a graph edge from the graph node representing the conditional jump instruction to a graph node representing a fallthrough instruction pointer address of the conditional jump instruction; and create, for each other graph node not representing a return instruction, a graph edge from the graph node to a next graph node in instruction pointer address order.

21. The one or more computer-readable storage media of claim 18, wherein to recursively detect the one or more binary loops within the control-flow graph comprises to:

identify a strongly-connected component having a plurality of graph nodes within the control-flow graph;

build a depth-first search tree of the strongly-connected component, wherein the depth-first search tree has a root node that is the graph node having the smallest instruction pointer address within the strongly-connected component; and detect all loop start graph nodes within the strongly-connected component, wherein each loop start graph node is a destination of a backward edge of the depth-first search tree.

22. The one or more computer-readable storage media of claim 21, wherein:

to calculate the trip count for each of the one or more binary loops comprises to determine a number of iterations of each of the one or more binary loops; and to determine the number of iterations of a binary loop comprises to sum a taken count associated with all backward edges of the depth-first search tree having a destination that is a root node of the strongly-connected component associated with the binary loop.

23. The one or more computer-readable storage media of claim 21, wherein:

to calculate the trip count for each of the one or more binary loops comprises to determine a number of invocations of each of the one or more binary loops; and to determine the number of invocations of a binary loop comprises to:
- identify all edges of the control flow graph exiting the strongly-connected component associated with the binary loop; and
- sum a taken count associated with the edges exiting the strongly-connected component, wherein the taken count is indicative of a number of times that the control flow of the binary code followed each of the edges that exit the strongly-connected component.

* * * * *